United States Patent [19]
Terry

[11] Patent Number: 5,995,924
[45] Date of Patent: Nov. 30, 1999

[54] COMPUTER-BASED METHOD AND APPARATUS FOR CLASSIFYING STATEMENT TYPES BASED ON INTONATION ANALYSIS

[75] Inventor: Alvin Mark Terry, Longmont, Colo.

[73] Assignees: U.S. West, Inc., Denver; MediaOne Group, Inc., Englewood, both of Colo.

[21] Appl. No.: 09/083,449

[22] Filed: May 22, 1998

Related U.S. Application Data

[63] Continuation of application No. 08/850,976, May 5, 1997.

[51] Int. Cl.$^6$ ....................................................... G10L 7/00
[52] U.S. Cl. .......................... 704/207; 704/232; 704/233
[58] Field of Search ................................... 704/207, 208, 704/202, 226, 232, 233, 255

[56] References Cited

U.S. PATENT DOCUMENTS

| | | |
|---|---|---|
| 3,420,955 | 1/1969 | Noll . |
| 4,091,237 | 5/1978 | Wolnowsky et al. . |
| 4,398,059 | 8/1983 | Lin et al. . |
| 4,532,648 | 7/1985 | Noso et al. . |
| 4,597,098 | 6/1986 | Noso et al. . |
| 4,627,091 | 12/1986 | Fedele . |
| 4,692,941 | 9/1987 | Jacks et al. . |
| 4,696,041 | 9/1987 | Sakata . |
| 4,696,042 | 9/1987 | Goudie . |
| 4,797,930 | 1/1989 | Goudie . |
| 4,817,155 | 3/1989 | Briar et al. . |
| 4,912,768 | 3/1990 | Benbassat . |
| 5,293,588 | 3/1994 | Satoh et al. . |
| 5,305,422 | 4/1994 | Junqua . |
| 5,317,673 | 5/1994 | Cohen et al. . |
| 5,361,327 | 11/1994 | Takahashi . |
| 5,377,302 | 12/1994 | Tsiang . |
| 5,459,814 | 10/1995 | Gupta et al. . |
| 5,509,103 | 4/1996 | Wang . |
| 5,522,012 | 5/1996 | Mammone et al. . |
| 5,636,325 | 6/1997 | Farrett . |

OTHER PUBLICATIONS

Butzberger et al., "Isolated Word Recognition Using Hidden Markov Models," 1990 Conference on Acoustics, Speech and Signal Processing, IEEE, pp. 773–776, Apr. 3, 1990.

Grigoriu et al., "An Automatic Intonation Tone Countour Labelling and Classification Algorithm," 1994 IEEE International Conference on Acoustics, Speech and Signal Processing, pp. 181–184, Apr. 19, 1994.

Niemann et al. "Pitch Determination Considering Laryngealization Effects In Spoken Dialogs," 1994 IEEE International Conference on Neural Networks, pp. 4447–4461, Jun. 27, 1994.

*Primary Examiner*—David R. Hudspeth
*Assistant Examiner*—Martin Lerner
*Attorney, Agent, or Firm*—Brooks & Kushman

[57] ABSTRACT

A computer-based method and apparatus for classifying statement types using intonation analysis. The method and apparatus identify a user's potential query when the user responds to information during dialog with an automated dialog system. Pitch information is extracted, via a cepstrum, from the speech signal. In one embodiment, the pitch intonation is processed to form a smoothed pitch or intonation contour. Then the smoothed pitch contour is processed by a set of shape detectors and this output, together with statistical information, is sent to a rule-based algorithm which attempts to classify the statement type. In another embodiment, the smoothed pitch contour is processed by a pattern recognition system such as a neural network trained with a back-propagation learning algorithm.

15 Claims, 5 Drawing Sheets

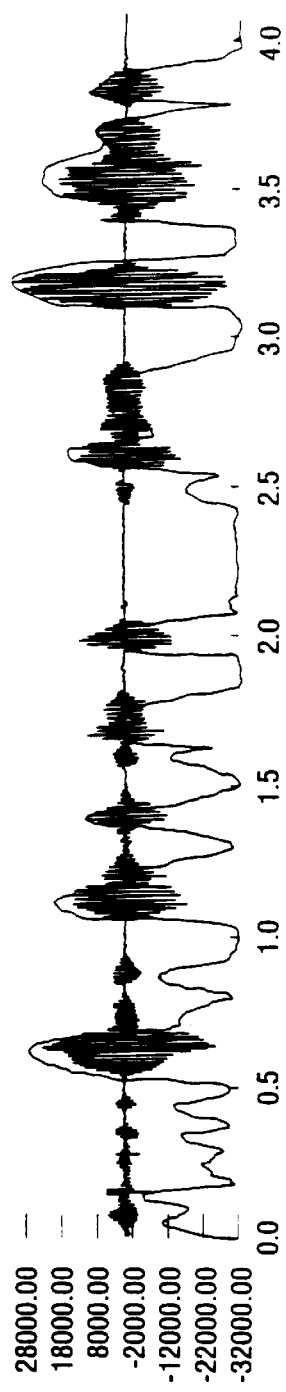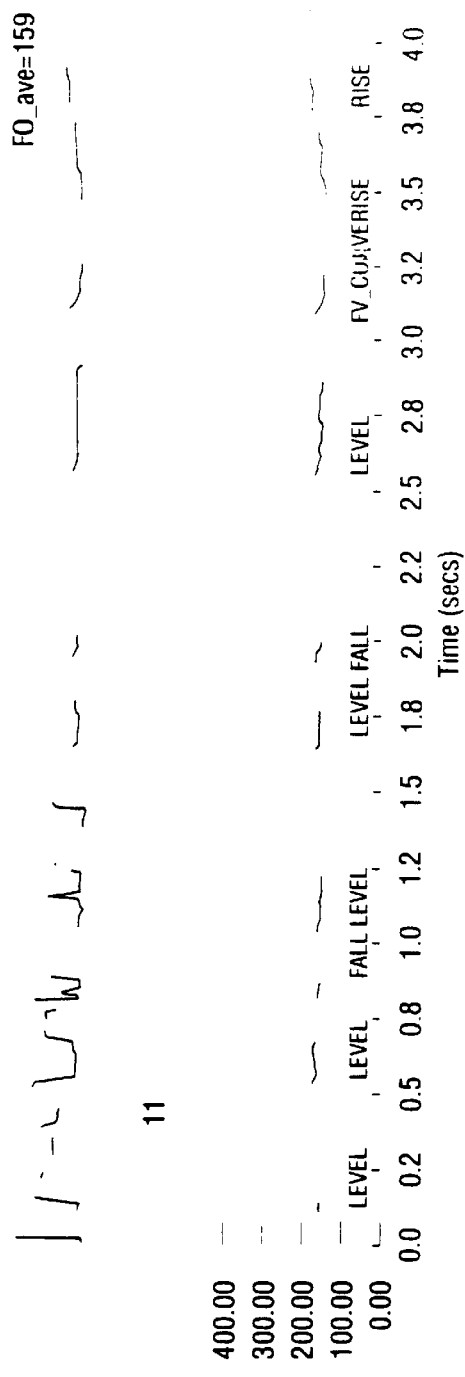
Fig. 2a
Fig. 2b
Fig. 2c
Fig. 2d

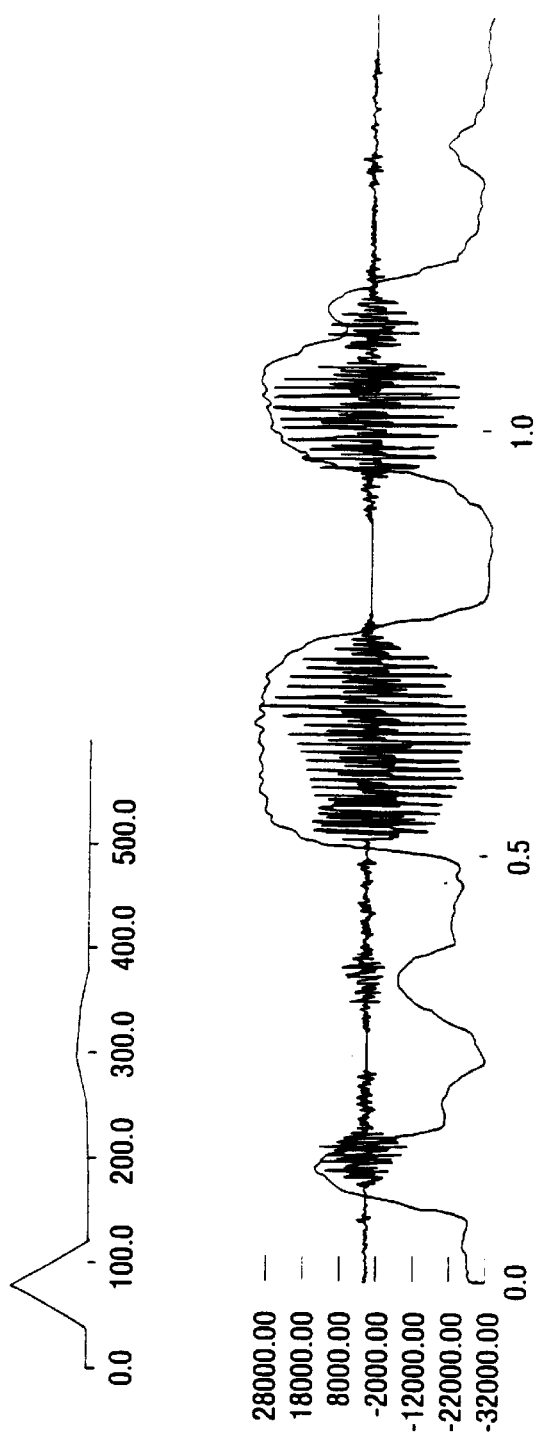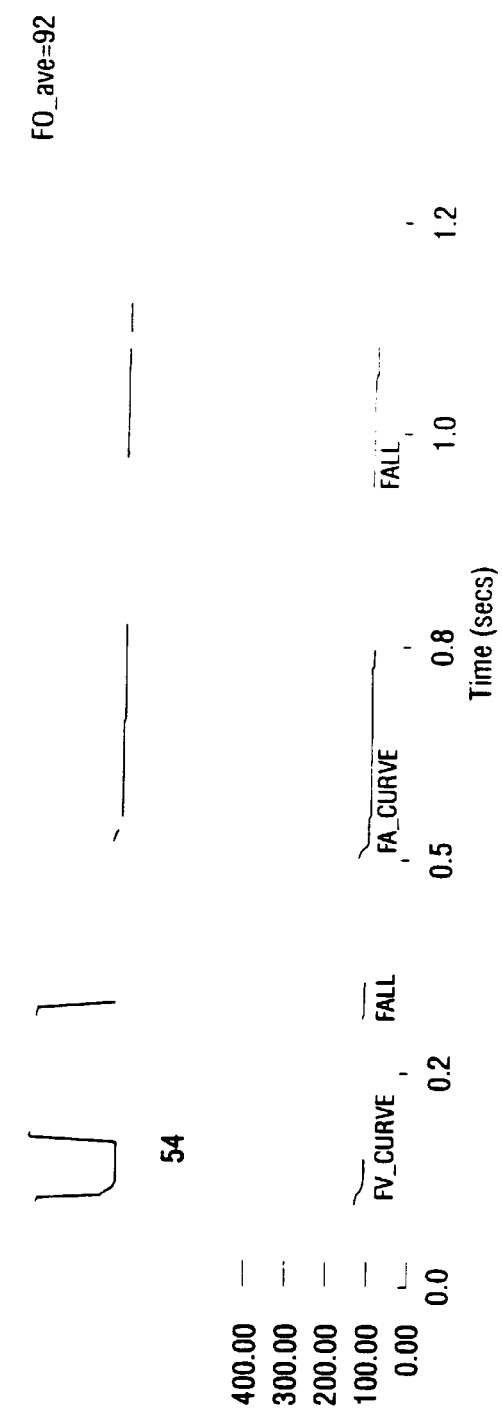
Fig. 3a
Fig. 3b
Fig. 3c
Fig. 3d

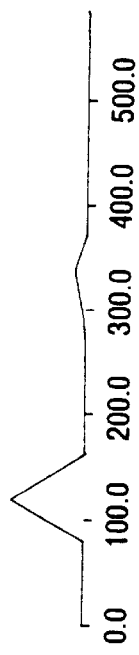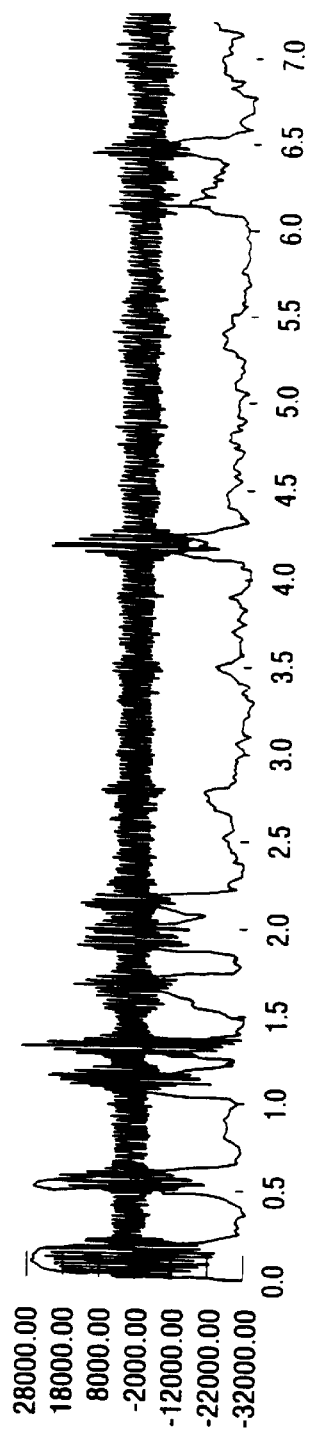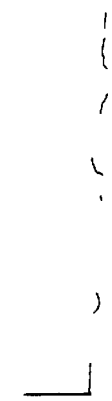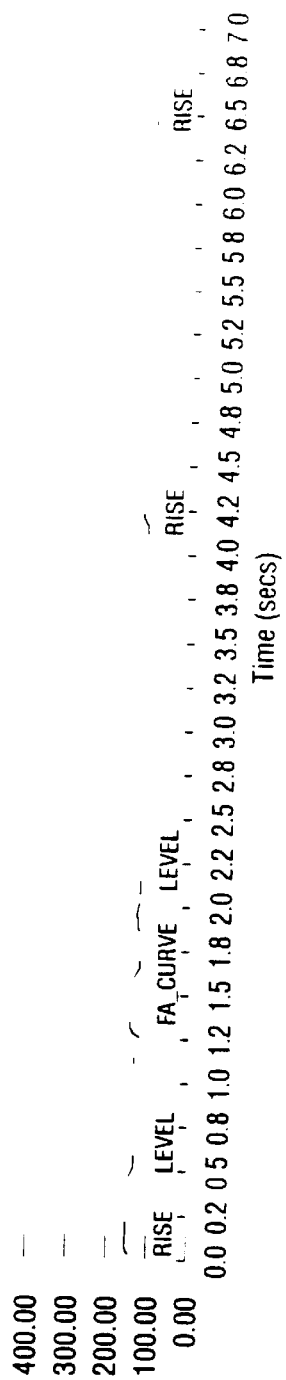
Fig. 4a
Fig. 4b
Fig. 4c
Fig. 4d

COMPUTER-BASED METHOD AND APPARATUS FOR CLASSIFYING STATEMENT TYPES BASED ON INTONATION ANALYSIS

This is a continuation of application Ser. No. 08/850,976 filed on May 5, 1997.

TECHNICAL FIELD

This invention relates to methods and apparatus for classifying statement types and, in particular, to methods and apparatus for classifying statement types through intonation analysis.

BACKGROUND ART

In dialog where one individual is giving instructions to a second individual, the second individual will often repeat part or all of a previous instruction, sometimes merely to acknowledge correct receipt of the information but also sometimes to act as an abbreviated query which, in natural dialog, would result in repetition or clarification of the previous instruction. In English, this acknowledgment/query distinction is made with reference to intonation cues, typically a rising or falling pitch contour.

In an automated dialog system, even given accurate speech recognition, confusion would result if such a user's query is ignored, or if a user's acknowledging statement is misunderstood and results in the system needlessly repeating a previous instruction. One way of tackling this problem would be to try to constrain the user's responses, and in most current systems, this is the approach that is taken. However, if one wishes to move to natural open dialog then besides trying to determine what is said, one should also pay some attention to how it is said.

To illustrate, some possible interactions for a service which provides road navigation directions to users over a cellular phone are illustrated below. Assume the user has accessed the system and given the details of present location and destination. The system will then proceed to give directions. Ideally during this process, the system should be able to deal with user queries. For example, in response to the instruction "Turn right at main street", the system may have to distinguish between the responses:

(a) Do I turn right at main street? or (b) so RIGHT? at main, or (c) right at MAIN? or (d) Okay, right at main.

In the first example, correct word recognition would result in the user's response being treated as a query. However, in the other examples, a correct response requires dealing with the intonational cues present in the speech signal. In fact, to correctly respond to (b) and (c), a system should not only decide that there is a query but also which item is being queried, i.e. is the direction or the location that is being queried?

The following papers generally describe methods and apparatus for classifying speech using intonational features: Wightman, C. W. and Ostandorf, M. "Automatic Recognition of Intonational Features" and Schmandt, C. "Understanding Speech Without Recognizing Words."

SUMMARY OF THE INVENTION

An object of the present invention is to provide a method and apparatus for classifying statement types utilizing intonation cues present in the speech signal in a similar way to a human English speaker.

This information used in conjunction with the information from a speech recognition component may be used to assist in attaining a more natural type of automated dialog for use in voice automated information services.

In carrying out the above object and other objects of the present invention, a method is provided for classifying statement types through intonation analysis. The method includes the steps of receiving a signal which represents the energy content of a voiced utterance having a pitch and varying background noise energy levels and generating a background noise energy threshold level from the signal. The method also includes the steps of extracting pitch values from the signal whenever the energy of the signal is above the threshold level for the entire voiced utterance and generating a smoothed intonation contour from the pitch values. Segments of the contour correspond to voicing in the signal. The method finally includes the step of applying an algorithm to the smoothed intonation contour which algorithm distinguishes between a question statement and an acknowledgment statement.

In one embodiment, the algorithm is a rule-based algorithm and in another embodiment, the step of applying includes the step of inputting portions of the smoothed intonation contour as input vectors to a pattern recognition system such as a neural network to recognize the different statement types.

Further in carrying out the above objects and other objects of the present invention, an apparatus is provided for carrying out each of the above method steps.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 2a is a graph illustrating a pitch histogram of a typical query;

FIG. 2b is a graph of a speech signal corresponding to the query of FIG. 2a;

FIG. 2c is a graph of raw pitch data derived from the signal of FIG. 2b;

FIG. 2d is a graph of a smoothed pitch contour derived from the raw pitch data of FIG. 2c;

FIG. 3a is a graph illustrating a pitch histogram of a typical statement;

FIG. 3b is a graph of a speech signal corresponding to the statement of FIG. 3a;

FIG. 3c is a graph of raw pitch data derived from the signal of FIG. 3b;

FIG. 3d is a graph of a smoothed pitch contour derived from the raw pitch data of FIG. 3c;

FIG. 4a is a graph illustrating a pitch histogram of a second query;

FIG. 4b is a graph of a speech signal corresponding to the second query of FIG. 4a but in the presence of significant channel noise;

FIG. 4c is a graph of raw pitch data derived from the signal of FIG. 4b;

FIG. 4d is a graph of a smoothed pitch contour derived from the raw pitch data of FIG. 4c.

BEST MODE FOR CARRYING OUT THE INVENTION

Figure 1:
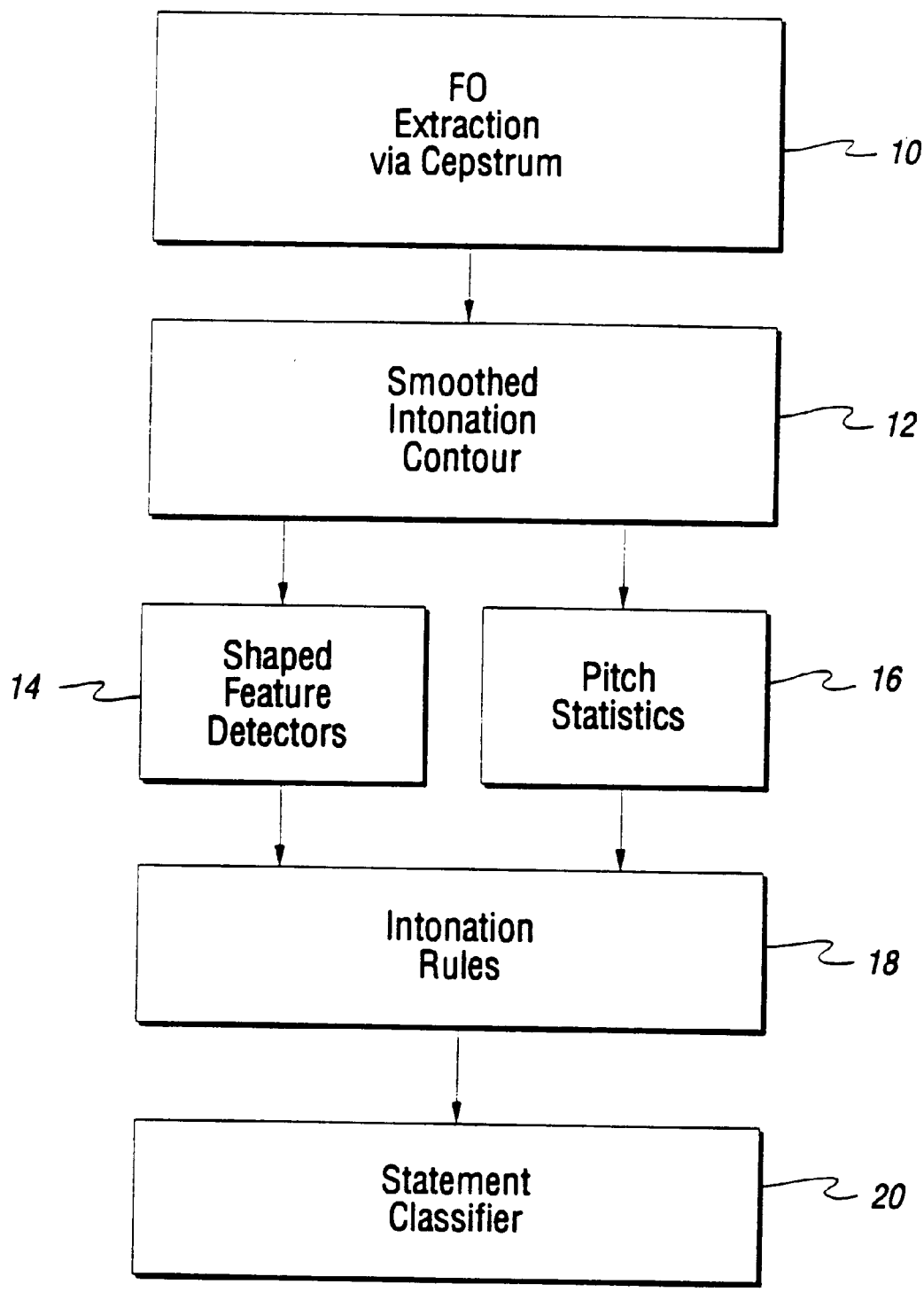
FIG. 1 is a block schematic diagram illustrating a method and apparatus of the present invention.
Figure 5:
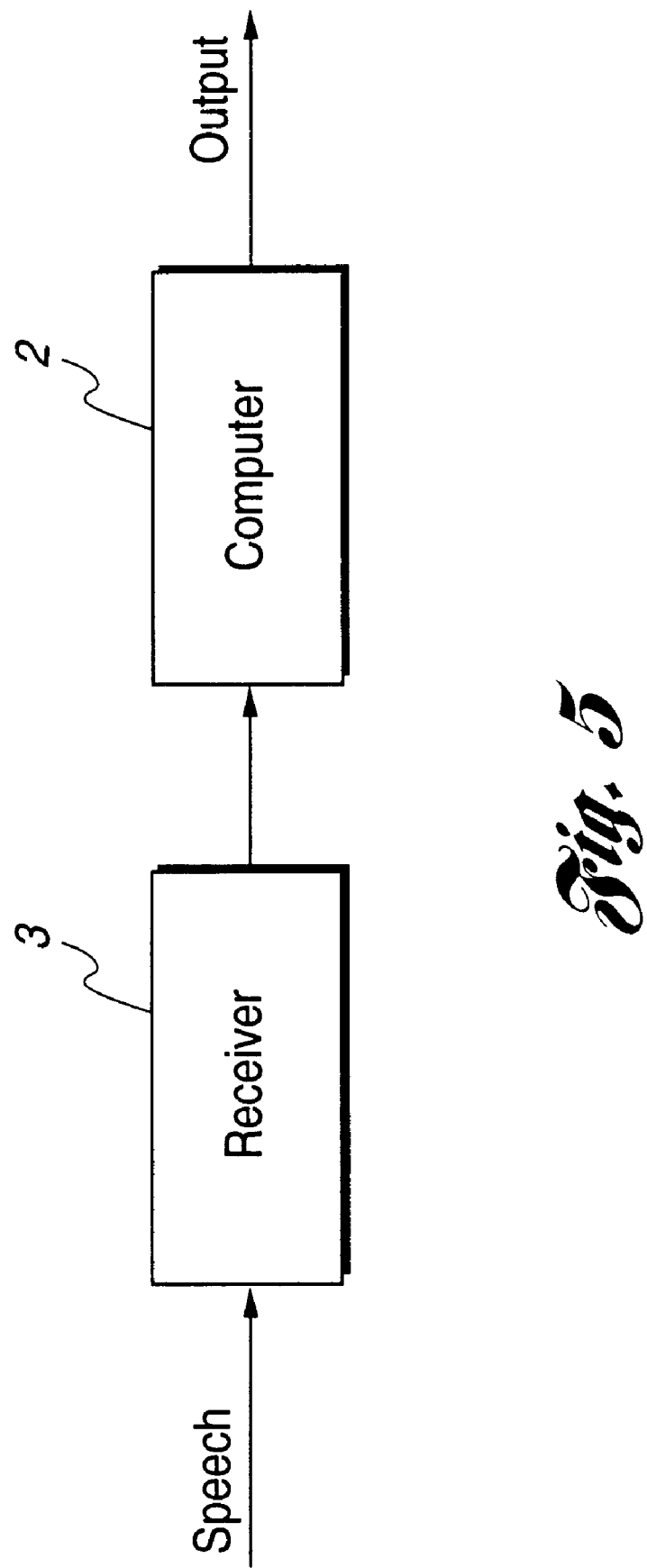
FIG. 5 is a block diagram illustrating the apparatus of the present invention including a receiver and a programmed computer.

Referring now to the drawing figures, there is illustrated in FIG. 1 a generalized block diagram illustrating the method and apparatus of the present invention. Preferably, the method and apparatus of the present invention is implemented on a suitably programmed computer 2 such as a Sun Spark II workstation, as illustrated in FIG. 5.

At block 10 of FIG. 1, the pitch (F0) (i.e. fundamental frequency) is extracted from a speech signal received at the computer via a receiver 3. The signal represents the energy content of a voiced utterance having varying background noise energy levels.

Preferably, the pitch is extracted from the speech signal by a cepstrum. For purposes of this application, the following definitions will apply:

Cepstrum. Inverse Fourier transform of the logarithm of the Fourier power spectrum of a signal. The complex cepstrum is the inverse Fourier transform of the complex logarithm of the Fourier transform of the signal.

Pitch. Frequency of glottal vibration of a voiced utterance.

Spectrum or power density spectrum. Amplitude of a signal as a function of frequency, frequently defined as the Fourier transform of the autocovariance of the signal.

Speech analysis. Process of extracting time-varying parameters from the speech signal which represent a model for speech production.

Speech synthesis. Production of a speech signal from a model for speech production and a set of time-varying parameters of that model.

Voicing. Classification of a speech segment as being voiced (i.e. produced by glottal excitation), unvoiced (i.e. produced by turbulent air flow at a constriction) or some mix of those two.

Also at block 10, a short term energy profile is extracted from the speech signal as will be discussed in greater detail herein below.

At block 12, the pitch or pitch signal is processed to form a smoothed intonation or pitch contour as will also be described in greater detail herein below.

At block 14, the intonation contour is processed by shape feature detectors.

At block 16, pitch statistics are generated from the intonation contour.

At block 18, output from the shape feature detectors block 14 together with the pitch statistics 16 are operated upon by intonation rules or a rule component which classifies the user utterance as a statement or a query as represented at block 20.

Referring now to FIGS. 2a–2d, selected intermediate outputs of the method and apparatus are illustrated wherein FIG. 2b shows a graph of the speech signal representing a typical query. The speech signal is analyzed or processed within the programmed computer and generates at an intermediate processing step raw pitch data as illustrated in FIG. 2c. Subsequently, the raw pitch data is processed into a smoothed pitch contour as illustrated in FIG. 2d. FIG. 2a illustrates a pitch histogram also constructed at an intermediate step from the speech signal of FIG. 2b, as is described in greater detail herein below.

In like fashion, FIGS. 3a–3d show a typical statement where the intonation contour shows a general fall in pitch across the entire statement.

Likewise, in FIGS. 4a–4d, there is illustrated a second query but in the presence of significant channel noise.

Pitch Extraction

The speech signals may originate from a cellular phone which would typically be band-limited in the region 300–2500 Hz. Since the range of possible pitch values range from 60 Hz to upwards of 600 Hz, the pitch extraction algorithm must (for pitch values below 300 Hz) be capable of reconstructing the fundamental pitch signal from the higher harmonics present in the telephone band 300–2500 Hz. A cepstrum-based pitch tracker was chosen since it works reasonably well with the band-limited speech and it is not level dependent.

In order to produce a pitch-track for speech signals with varying background noise levels, the following operations are carried out:

a) a histogram of short-term energy levels is built and a background noise energy level is estimated, b) the cepstrum is computed for all times when the energy is above the energy threshold using a broad time window (40 msec), c) a pitch histogram is built for the entire utterance and this is used to estimate probable pitch, d) a second pass is then made using an adaptive time-length window and the cepstrum is again computed to estimate pitch. Energy level constraints are relaxed if the cepstrum track indicates voicing is present. The cepstrum is averaged across three successive estimates.

(e) logic is used to correct for pitch doubling or halfing, (f) missing values are interpolated if good neighboring estimates are present, (g) previously rejected values are reconsidered if a "better" pitch track can be constructed, and (h) overall pitch statistics such as average, range and variance are computed for the utterance.

The output from this component of the invention is a smoothed intonation contour (i.e. block 12).

Intonation Contour Processing

Each segment of the contour which corresponds to voicing in the speech signal (as determined by the cepstrum) is subjected to shape categorization and the following parameters are estimated: duration, average pitch value and variance, pitch slope, goodness of fit (obtained via fitting best straight line using minimum square error), maximum and minimum pitch values. The possible shapes are convex, concave or straight line, and these are associated with a general rise, fall or level trend. The output of the shape detectors 14 together with pitch statistics 16 for the utterance are then fed to a component 18 which makes an analysis of the intonation pattern and attempts to classify statement type via a set of rules.

Intonation Analysis

The rules used are in part derived by examination of a cellular telephone database of the assignee of the patent application and input from the following literature: (1) Watt, D. L. E., (1990) "Rising Pitch Movements In English Intonation Contours", WORD, Vol. 41, 2 pp. 145–159; (2) Pierrehumbert J. and Hirschberg, J. (1990) "The Meaning of Intonational Contours in the Interpretation of Discourse", in "Intentions in Communication" eds Cohen, P., Morgan, J., and Pollack, M., MIT press; and (3) Wightman, C. W. (1992) "Automatic Detection of Prosodic Constituents for Parsing", Dissertation Boston University, all of which are incorporated in their entirety by reference herein. Examples of two simple rules follow:

(1) A general falling pitch value across the utterance is categorized as statement.

(2) If the final portion shows a rise and is of significant duration, then it is categorized as a query.

Optimal values for "significant" rate of rise and duration have been set by examination of the abovementioned database. There are preferably a number of rules of varying complexity in the rule component. For example, a modification to the second rule states that if the pitch remains level and relatively high then the utterance is to be interpreted as a query. The other rules take into account the number of syllables together with pitch statistics for the statement as well as the shape of pitch movement for each syllable. This component also computes a confidence level which is associated with the statement classification.

Results and Discussion

About one-half of the cellular database was used to train the system (optimize parameters and to test rules) and the other half was used to test the system. If one looks at two basic statement types, where a query is cued by a rising intonation and a statement by a general falling intonation (as perceived by the human English speaker) then the automated system performs 93% correct on the training set and 89% on the testing database. Performance on the training set is shown in Table 1.

TABLE 1

QUASI Performance on Training Set

| % | QUERY | ACKN | TRIALS |
|---|---|---|---|
| QUERY | 91.7% | 8.3% | 60 |
| ACKN | 5.5% | 94.5% | 55 |

Performance on the testing set is shown in Table 2.

TABLE 2

QUASI Performance on Testing Set

| % | QUERY | ACKN | TRIALS |
|---|---|---|---|
| QUERY | 89.1% | 10.9% | 64 |
| ACKN | 11.7% | 88.3% | 418 |

In the situation where an English speaker is listening to a list of items or set of instructions another statement type is commonly used. Utterances such as "okay" and "uh-huh" are employed by users to acknowledge correct receipt of an instruction and also to signal readiness to receive further information. These statements usually have a rising intonation contour and as such are similar to possible queries like "turn left?". It is possible, however, to make some distinction of these statement types by looking at the shape of pitch rise as described in the paper of Watt, D. L. E., (1990) "Rising Pitch Movements In English Intonation Contours", WORD, Vol. 41, 2 pp. 145–159. For some speakers, there was some consistency in the shape of the pitch rise and this cue could be used to discriminate the "go-on" statement type from a query of short duration. However, for most speakers, this cue was not reliable. This would also indicate that an automated system may have to learn something about an individual's speaking style before attempting such distinctions. The practical solution to this is to use word-spotting for items such as "okay", "go-on" and "uh-huh".

Recognizing a query which has a general falling intonation presents problems. This statement type occurs when the speaker expects the answer to the query to be negative or where the response is other than a simple yes or no. However, it may be possible to make some discrimination by examining in more detail parameters which are associated with a speakers pitch range, since this type of statement often starts higher in the pitch range than a typical non-query statement.

The method and apparatus of the present invention is designed to recognize the presence of a query in a user's response mainly by making use of intonational cues. When supplemented by accurate speech recognition, the system can be used to verify presence of a query when the query words "why, how, what, when" are present and are correctly recognized. However, in spoken language, many natural queries do not include these words and the statement function is carried by prosodic and intonation cues. In fact, the meaning of a statement can entirely be changed by the use of different intonation. Thus, a voice automated information service which exhibits "natural discourse qualities" would appear to require use of a method and apparatus similar to that described herein.

An extra benefit of the method and apparatus of the present invention to process intonation would be to assist automatic speech recognition by disambiguating certain phrases and marking word and phrase boundaries. Analysis of intonation and energy contours may eventually allow one to automatically identify the nucleus of a phrase which will be helpful in word identification from phoneme streams.

Intonation Contour Processing—Neural Network Based

The above-described method and apparatus is rule-based. However, a neural-net (i.e., neural network) based system which attempts to recognize different statement types by extracting intonation patterns when given a smoothed intonation contour as input information is also possible. The neural-net system gave a performance of 85% when tested on the two basic statement types, where a query was associated with a rising pitch and a non-query by falling pitch. This result is of interest because if the net is supplied with other information such as syllable rate, duration and long-term pitch statistics, its performance may yet exceed the rule-based system. Neural-nets would give a speed advantage in terms of implementation. They may also be able to recognize subtle differences in intonation contours that would be difficult to describe in terms of rules.

Conclusion

Method and apparatus to identify statements as queries or acknowledgments by analyzing the intonation contour from cellular telephone speech signal is described above. The performance of the system is sufficiently accurate to be of benefit for any automated voice information service.

While the best mode for carrying out the invention has been described in detail, those familiar with the art to which this invention relates will recognize various alternative designs and embodiments for practicing the invention as defined by the following claims.

What is claimed is:

1. A computer-based method for classifying statement types through intonation analysis, the method comprising the steps of:
   receiving a signal band limited in a region of 300 Hz to 2500 Hz which represents the energy content of a voiced utterance having a pitch in the range of 60 Hz to 600 Hz and varying background noise energy levels;
   generating a signal representation of short term energy levels for the signal;
   generating a background noise energy threshold level based on the signal representation;
   extracting pitch values from the signal whenever the energy of the signal is above the threshold level for the entire voiced utterance;
   generating a smoothed intonation contour from the pitch values;
   processing segments of the smoothed intonation contour corresponding to voicing in the signal according to predetermined shape feature detectors to obtain a plurality of pitch parameters; and
   applying an algorithm to the pitch parameters which algorithm distinguishes between a question statement and an acknowledgment statement.

2. The method as in claim 1 wherein the step of extracting includes the step of calculating a cepstrum from the signal whenever the energy of the signal is above the threshold level.

3. The method as in claim 2 wherein the cepstrum is calculated from the signal whenever the energy of the signal is above the threshold level by utilizing a broad time window.

4. The method as in claim 2 wherein the step of calculating is also performed whenever the energy of the signal is above a variable threshold level and segments of the signal correspond to voicing in the signal.

5. The method as in claim 1 wherein the algorithm is a rule-based algorithm.

6. The method as in claim 1 wherein the step of applying includes the step of inputting portions of the smoothed intonation contour as input vectors to a pattern recognition system to distinguish between the question statement and the acknowledgment statement.

7. The method as in claim 6 wherein the pattern recognition system includes a neural network having an input layer, a hidden layer, and an output layer.

8. The method as in claim 7 wherein the pattern recognition system performs a back-propagation analysis.

9. A computer-based apparatus for classifying statement types through intonation analysis, the apparatus comprising:
   means for receiving a signal band limited in a region of 300 Hz to 2500 Hz which represents the energy content of a voiced utterance having a pitch in the range of 60 Hz to 600 Hz and varying background noise energy levels; and
   a computer programmed to:
      generate a signal representation of short term energy levels for the signal;
      generate a background noise energy threshold level based on the signal representation;
      extract pitch values from the signal whenever the energy of the signal is above the threshold level for the entire voiced utterance;
      generate a smoothed intonation contour from the pitch values;
   processing segments of the smoothed intonation contour corresponding to voicing in the signal according to predetermined shape feature detectors to obtain a plurality of pitch parameters; and
      apply an algorithm to the pitch parameters which algorithm distinguishes between a question statement and an acknowledgment statement.

10. The apparatus as in claim 9 wherein the algorithm is a rule-based algorithm.

11. The apparatus as in claim 9 wherein portions of the smoothed intonation contour are inputted as input vectors to a pattern recognition system to distinguish between the question statement and the acknowledgment statement.

12. The apparatus as in claim 11 wherein the pattern recognition system includes a neural network having an input layer, a hidden layer, and an output layer.

13. The apparatus as in claim 12 wherein the pattern recognition system performs a back-propagation analysis.

14. The apparatus as in claim 9 wherein the cepstrum is calculated from the signal whenever the energy of the signal is above the threshold level by utilizing a broach time window.

15. The apparatus as in claim 9 wherein the programmed computer also calculates the cepstrum from the signal whenever the energy of the signal is above a variable threshold level and segments of the signal correspond to voicing in the speech signal.

* * * * *